(12) United States Patent
Shimada (10) Patent No.: US 11,469,686 B2
(45) Date of Patent: Oct. 11, 2022

(54) SEMICONDUCTOR CIRCUITRY AND BRIDGE CIRCUITRY

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Eiji Shimada, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/018,029

(22) Filed: Sep. 11, 2020

(65) Prior Publication Data

US 2021/0297008 A1 Sep. 23, 2021

(30) Foreign Application Priority Data

Mar. 19, 2020 (JP) .............................. JP2020-049997

(51) Int. Cl.
*H02M 7/5387* (2007.01)
*H02M 3/335* (2006.01)

(52) U.S. Cl.
CPC ...... *H02M 7/5387* (2013.01); *H02M 3/33553* (2013.01)

(58) Field of Classification Search
CPC ........ H02M 7/162; H02M 7/219; H02M 7/42; H02M 7/44; H02M 7/48; H02M 7/4811;

(Continued)

(56) References Cited

U.S. PATENT DOCUMENTS 6,473,284 B1 * 10/2002 Ilic .......................... H02M 1/32
361/18
6,605,976 B2    8/2003 Middel
(Continued)

FOREIGN PATENT DOCUMENTS

| JP | 2005-501499 A |   | 1/2005 |
|----|---------------|---|--------|
| JP | 2007-538478 A |   | 12/2007 |
| JP | 2016-123199 A |   | 7/2016 |
| JP | 2016123199 A  | * | 7/2016 |
| JP | 2016-201547 A |   | 12/2016 |
| JP | 6471895 B2    |   | 2/2019 |

OTHER PUBLICATIONS

English translation of JP-2016123199-A. (Year: 2016).*

(Continued)

*Primary Examiner* — Thienvu V Tran
*Assistant Examiner* — Carlos O Rivera-Perez
(74) *Attorney, Agent, or Firm* — Foley & Lardner LLP (57) ABSTRACT

A semiconductor circuitry includes a plurality of diodes and a first resister. The semiconductor circuitry is arranged in a circuit in which a first transistor and a second transistor are connected to a power supply in series, and the circuit outputs a voltage applied to an external load. The plurality of diodes which are connected in parallel with a first transistor and a second transistor, are diodes to which a reverse bias is applied by the power supply, and are connected in series with each other, and in which each breakdown voltage is lower than a voltage of the power supply and the sum of breakdown voltage of all these diodes is higher than the voltage of the power supply. The first resistor which connects a connection node between the plurality of diodes and a connection node between the first transistor and the second transistor.

6 Claims, 5 Drawing Sheets

(58) Field of Classification Search
CPC .. H02M 7/4815; H02M 7/515; H02M 7/5152; H02M 7/5155; H02M 7/5157; H02M 7/521; H02M 7/523; H02M 7/5233; H02M 7/538; H02M 7/5387; H02M 7/53871; H02M 7/53873; H02M 7/53875; H02M 7/53878; H02M 3/22; H02M 3/24; H02M 3/335; H02M 3/33507; H02M 3/33523; H02M 3/33538; H02M 3/33546; H02M 3/33553; H02M 3/33571; H02M 3/33573; H02M 1/0085; H02M 1/14; H02M 1/143; H02M 1/15; H02M 1/32; H02M 1/34–348; H02M 1/4233; H02M 1/4241; H02M 1/4258; H02M 3/01; H02M 3/33569; H02M 3/33576; H02M 3/33584; H02M 3/33592; H02M 1/08
USPC ..... 363/15–21.18, 37, 40–43, 50, 51, 56.01, 363/56.02, 56.12, 123, 131–134, 138; 323/908; 361/88–92, 117, 118
See application file for complete search history.

(56) References Cited

U.S. PATENT DOCUMENTS

| | | | |
|---|---|---|---|
| 7,259,479 B1* | 8/2007 | Momber | H02M 7/2176 307/82 |
| 7,362,001 B2* | 4/2008 | Kusumi | H02J 7/0042 290/31 |
| 8,866,253 B2 | 10/2014 | Weis | |
| 2007/0222426 A1 | 9/2007 | Waffenschmidt | |
| 2017/0163127 A1* | 6/2017 | Markic | H01L 25/115 |

OTHER PUBLICATIONS

Katoh et al., "Temperature Dependence of Single-Event Burnout for Super Junction MOSFET", IEEE 27th International Symposium on Power Semiconductor Devices & IC's (ISPSD), 2015, 4 pages.

Shoji et al., "Reliability Design for Neutron Induced Single-event Burnout of IGBT", R&D Review of Toyota CRDL, vol. 46 No. 4 (2015) pp. 53-61.

* cited by examiner

SEMICONDUCTOR CIRCUITRY AND BRIDGE CIRCUITRY

CROSS REFERENCE TO RELATED APPLICATIONS

This application is based upon and claims the benefit of priority from the prior Japanese Patent Application No. 2020-049997, filed on Mar. 19, 2020, the entire contents of which are incorporated herein by reference.

FIELD

The embodiments of the present invention relate to a semiconductor circuitry and bridge circuitry.

BACKGROUND

Between the electronic terminals of the power semiconductor device may be applied reverse bias voltage. Generally, it is believed that the higher the reverse bias voltage, the lower the reliability of the circuit. Between electronic terminals of a power semiconductor element, a reverse bias voltage may be applied. In general, it is considered that the higher this reverse bias voltage is, the lower the reliability of a circuit is. For example, according to criteria for a certification test (AEC-Q101-Rev_D1) of a discrete element for automobile, the reverse bias voltage in a HTRB (High Temperature Reverse Bias) test is defined as a maximum rated voltage of an element. Further, it is widely known that SEB (Single Event Burnout) breakage caused by a neutron radiation occurs in a high-voltage power semiconductor element, and the higher the reverse bias voltage is, the higher a defect rate thereof becomes.

A circuit using a plurality of power semiconductor elements in series connection, such as an inverter or a converter, is widely used at present. In many of these cases, a bias voltage nearly equal to a power supply voltage is applied between power terminals in the power semiconductor elements during an operation suspension period of the circuit.

DETAILED DESCRIPTION

According to one embodiment, a semiconductor circuitry, in a circuitry in which a first transistor and a second transistor are connected to a power supply in series, and which outputs a voltage to be applied to an external load based on a voltage of a connection node between the first transistor and the second transistor, includes a plurality of diodes and a first resistor. The plurality of diodes which are connected in parallel with the first transistor and the second transistor, are reversely biased by the power supply, and are connected in series with each other, and breakdown voltage of each diode is lower than a voltage of the power supply and the sum of breakdown voltage of all these diodes is higher than the voltage of the power supply. The first resistor which connects a connection node between the plurality of diodes and a connection node between the first transistor and the second transistor.

Hereinafter, embodiments will be explained with reference to the drawings. In the following explanation, an operation period represents a period during which at least one of transistors included in a semiconductor device is driven, and an operation suspension period represents a period during which no transistor is driven.

First Embodiment

Figure 1:
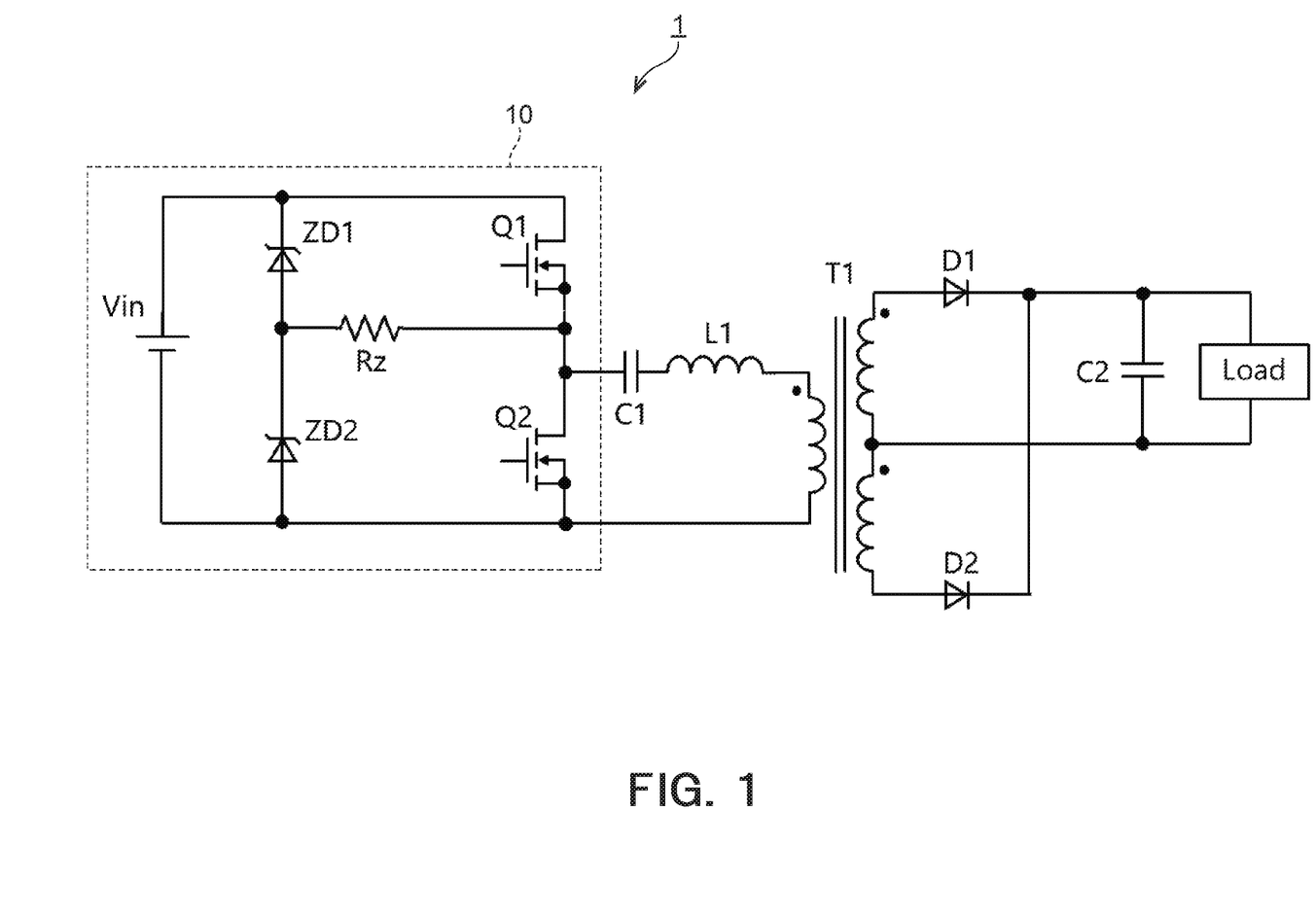
FIG. 1 is a circuitry diagram of a semiconductor circuit according to one embodiment.

FIG. 1 is a circuitry diagram of a half-bridge circuitry including a semiconductor device according to a first embodiment. A half-bridge circuitry 1 includes a semiconductor circuit 10 (semiconductor device) constituting a bridge. Incidentally, in the present disclosure, some circuitry examples including this semiconductor circuit 10 and some configurations of this semiconductor circuit 10 will be explained.

The semiconductor circuit 10 is a circuit which achieves operation of a switch used for a half-bridge circuitry and an H-bridge circuitry (full-bridge circuitry). The semiconductor circuit 10 includes a power supply Vin, a first transistor Q1, a second transistor Q2, a first diode ZD1, a second diode ZD2, and a resistor Rz.

The power supply Vin is a circuit which applies voltage to the half-bridge circuitry 1.

The first transistor Q1 is, for example, an n-type MOSFET (Metal-Oxide-Semiconductor Field-Effect Transistor), and Q1's drain is connected to a positive terminal of the power supply Vin and Q1's source is connected to a drain of the second transistor Q2. To Q1's gate, a drive signal is applied from a not-illustrated drive circuit.

The second transistor Q2 is, for example, an n-type MOSFET, and Q2's drain is connected to the source of the first transistor Q1 and Q2's source is connected to the negative terminal of the power supply Vin. Similarly to the first transistor Q1, to Q2's gate, a drive signal from the not-illustrated drive circuit is applied. In this second transistor Q2, its drive is controlled by the drive circuit so that a timing to turn on does not overlap an on timing of the first transistor Q1, for example.

These first transistor Q1 and second transistor Q2 are controlled so as to be turned on alternately similarly to transistors included in a typical bridge circuitry. The not-illustrated drive circuit may include, for example, a level shift circuit which raises a reference voltage of the first transistor Q1 and a dead time control circuit which inhibits Q1 from turning on when Q2 is on and inhibits Q2 from turning on when Q1 is on.

The first diode ZD1 is, for example, a Zener diode, and ZD1's anode is connected to a cathode of the second diode ZD2 and ZD1's cathode is connected to the positive terminal of the power supply Vin. The first diode ZD1 whose breakdown voltage is $\alpha \times Vin$ ($\alpha < 1$) is selected.

The second diode ZD2 is, for example, a Zener diode, and ZD2's anode is connected to the negative terminal of the power supply Vin and ZD2's cathode is connected to the anode of the first diode ZD1. The second diode ZD2 whose breakdown voltage is $\beta \times Vin$ ($1-\alpha < \beta < 1$) is selected. Therefore, $\alpha + \beta > 1$.

The first diode ZD1 and the second diode ZD2 are connected in series as described above, and connected in parallel with the first transistor Q1 and the second transistor Q2. Then, to the first diode ZD1 and the second diode ZD2, a reverse bias is applied by the power supply Vin.

The resistor Rz is connected between a contact node between the first transistor Q1 and the second transistor Q2, and, a contact node between the first diode ZD1 and the second diode ZD2.

The half-bridge circuitry further includes a capacitor C1, an inductor L1, a transformer T1, diodes D1, D2, and a capacitor C2.

The capacitor C1 is connected to the contact node between the first transistor Q1 and the second transistor Q2. The inductor L1 is connected in series with the capacitor C1. The transformer T1 is connected between the inductor L1 and the negative terminal of the power supply Vin. In the diodes D1, D2, anodes are connected to terminals of respective both ends of inductors on the output side of the transformer T1, and cathodes are connected to each other. Then, the capacitor C2 is connected in parallel with a load Load. A configuration further including an inductor between the diodes D1, D2 and the capacitor C2 is applicable. This circuit portion achieves operation similar to a typical half-bridge circuitry, thus omitting a detailed explanation.

The operation of the circuitry connected in such a manner will be explained. Hereinafter, a drain-source voltage of the first transistor Q1 is defined as Vds1, a drain-source voltage of the second transistor Q2 is defined as Vds2, a cathode-anode voltage of the first diode ZD1 is defined as Vzd1, and a cathode-anode voltage of the second diode ZD2 is defined as Vzd2.

As mentioned above, $\alpha+\beta>1$. When both the first transistor Q1 and the second transistor Q2 are off, neither the first diode ZD1 nor the second diode ZD2 is broken down. Because $(\alpha+\beta) \times \text{Vin} > \text{Vin}$ due to the fact that $\alpha+\beta>1$.

First, in an operation state, voltages of the first transistor Q1 and the second transistor Q2 have the following relationship.

$$Vin = Vds1 + Vds2 \qquad (1)$$

According to a connection state illustrated in FIG. 1, regarding the voltage of the first diode ZD1, the voltage of the second diode ZD2, and a voltage applied to these diodes connected in series, the following formulas hold.

$$Vzd1 < \alpha \cdot Vin \qquad (2)$$

$$Vzd2 < \beta \cdot Vin \qquad (3)$$

$$Vin = Vzd1 + Vzd2 \qquad (4)$$

From the formula (2) and the formula (4), $$Vin < \alpha \cdot Vin + Vzd2 \qquad (5)$$

holds. When this formula is transformed, $$(1-\alpha)^{SM} Vin < Vzd2 \qquad (6)$$

holds. According to the formula (3) and the formula (6), $$(1-\alpha) \cdot Vin < Vzd2 < \beta \cdot Vin \qquad (7)$$

holds.

This formula (7) indicates that the voltage of Vzd2 becomes a value between $(1-\alpha) \times Vin$ and $\beta \times Vin$. Since the drain of the second transistor Q2 is connected to the cathode of the second diode ZD2 via the resistor Rz, the following formula holds once a predetermined time (sufficient time) passes after an operation suspension period of the half-bridge circuitry 1 is started. Incidentally, during this predetermined time, a Zener current flows through the first diode ZD1 or the second diode ZD2, and an electric charge is supplied to the capacitor C1 and a parasitic capacitance via the resistor Rz.

$$Vds2 = Vzd2 \qquad (8)$$

By substituting the formula (7) for the formula (8), $$(1-\alpha) \cdot Vin < Vds2 < \beta \cdot Vin \qquad (9)$$

holds. Similarly, alternatively, by substituting this formula (9) for the formula (1), a relationship indicated in the following formula holds.

$$(1-\beta) \cdot Vin < Vds1 < \alpha \cdot Vin \qquad (10)$$

$\alpha+\beta<1$ prevents the left sides of the formula (9) and the formula (10) from being larger than the right sides thereof.

Thus, during the operation suspension period, it becomes possible to limit Vds1 to less than $\alpha \times Vin$ and Vds2 to less than $\beta \times Vin$. For example, in a case of $\alpha=\beta=0.6$, both of Vds1 and Vds2 can be limited to a value lower than 0.6 Vin.

As described above, according to this embodiment, the reverse bias voltage applied between the power terminals of each transistor when all the transistors are off can be reduced by the diodes having the proper breakdown voltage arranged in parallel with the transistors.

Incidentally, in the above, as one example, $\alpha=\beta=0.6$ is set, but this is not restrictive. For example, $\alpha=0.4$, $\beta=0.8$, or the like is applicable. When the first transistor Q1 and the second transistor Q2 have equal characteristics, $\alpha=\beta$ is desirable for the purpose of symmetry of the circuit. $\alpha+\beta>1$ has to be satisfied.

Second Embodiment

Figure 2:
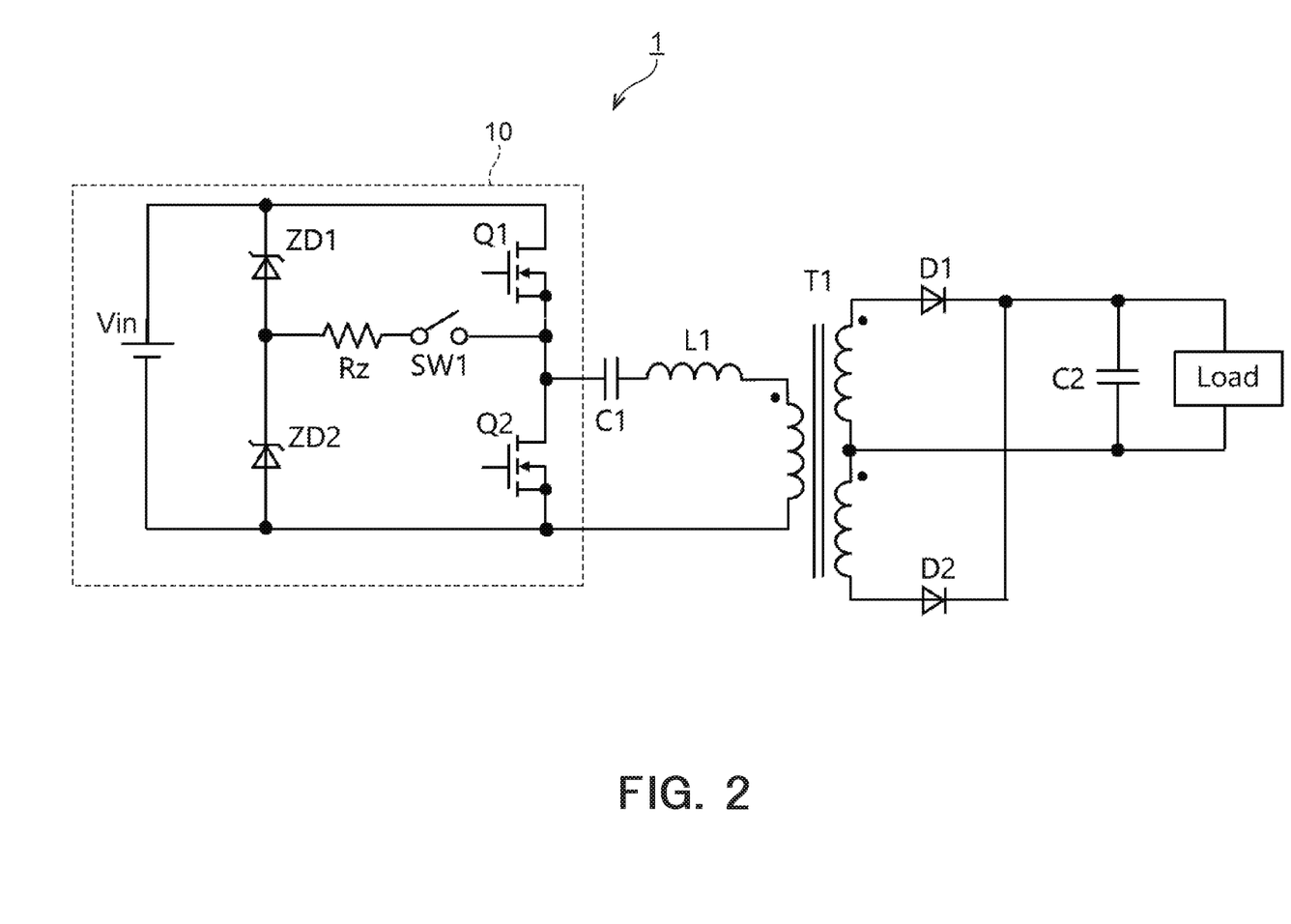
FIG. 2 is a circuitry diagram of a semiconductor circuit according to one embodiment.

FIG. 2 is a circuitry diagram of a half-bridge circuitry according to a second embodiment. A semiconductor circuit 10 includes a switch SW1 connected in series with a resistor Rz.

This switch SW1 is controlled so as to be turned on only during an operation suspension period. In this case, during the operation suspension period, the above-described formula (1) to formula (10) hold similarly to the first embodiment. As a result, during the operation suspension period, similarly, it is possible to limit Vds1 and Vds2 according to Vds1<$\alpha \times$Vin and Vds2<$\beta \times$Vin.

During an operation period, the switch SW1 is turned off to interrupt a current flowing via the resistor Rz. As a result, it becomes possible to prevent occurrence of a voltage drop in the resistor Rz, which makes it possible to reduce a power loss during the operation period.

As described above, according to this embodiment, it becomes possible to reduce a reverse bias during the operation suspension period similarly to the first embodiment and to also avoid excessive power consumption in the semiconductor circuit 10 during the operation period.

Third Embodiment

Figure 3:
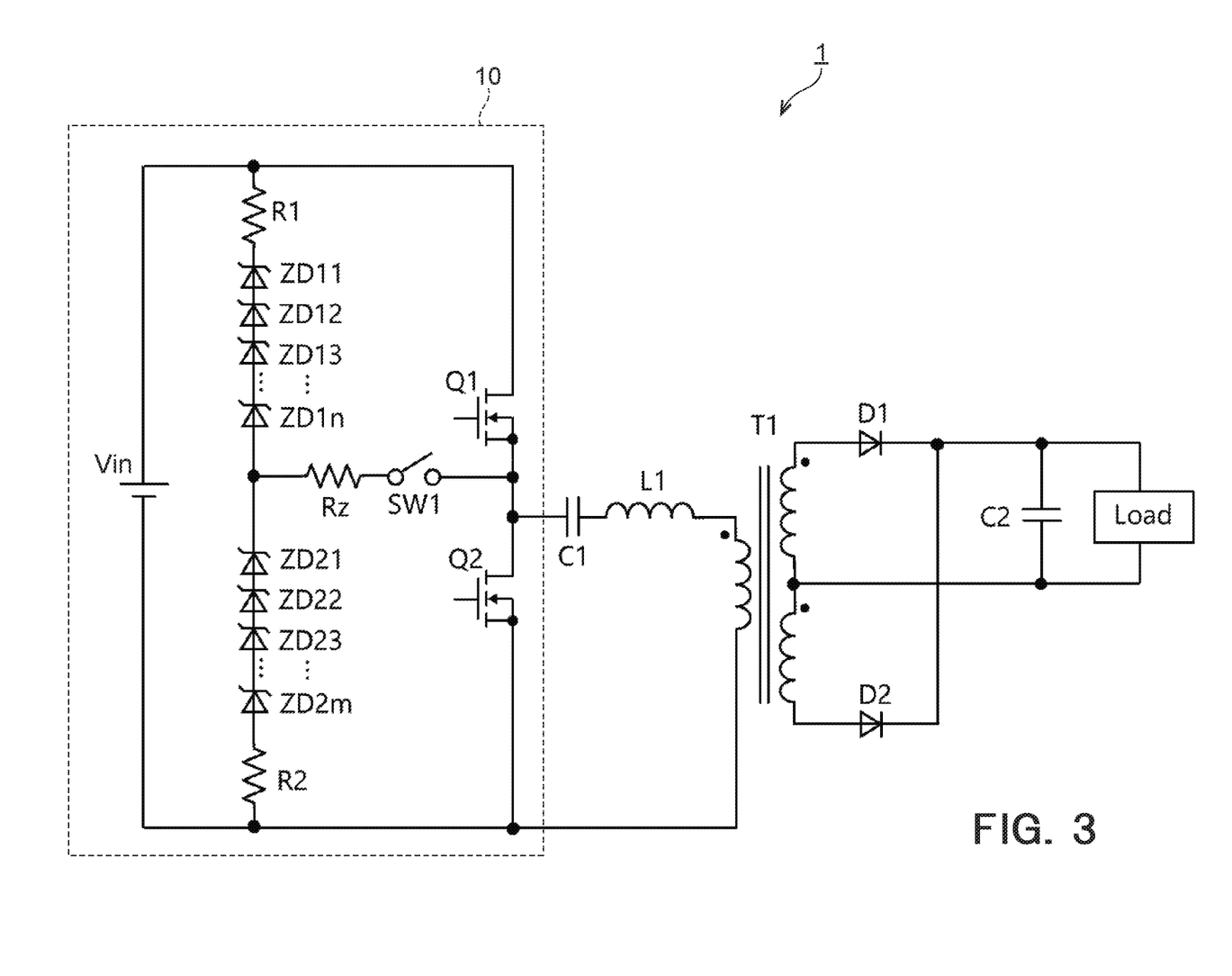
FIG. 3 is a circuitry diagram of a semiconductor circuit according to one embodiment.

FIG. 3 is a circuitry diagram of a half-bridge circuitry according to a third embodiment. A semiconductor circuit 10 includes a plurality of diodes ZD11, ZD12, ..., ZD1$n$ in place of the first diode ZD1, and moreover these diodes are connected to a positive terminal of a power supply via a resistor R1. Further, the semiconductor circuit 10 includes a plurality of diodes ZD21, ZD22, ..., ZD2$m$ in place of the second diode ZD2, and moreover these diodes are connected to a negative terminal of the power supply via a resistor R2.

A value obtained by adding up respective Zener voltages of the diodes ZD11, ZD12, ..., ZD1n, namely, a composed Zener voltage of these plurality of diodes is set to α×Vin (α<1). Similarly, a value obtained by adding up respective Zener voltages of the diodes ZD21, ZD22, ..., ZD2m is set to β×Vin (β<1).

The resistors R1, R2 are each a resistor which limits a current of the diodes. Moreover, they also achieve operation which increases a function of clamping a voltage due to the diodes.

Similar to the above-described second embodiment, a switch SW1 is off during an operation period, and is on during an operation suspension period.

Also in such a configuration, because the above-described formula (1) to formula (10) hold, similarly it becomes possible to limit Vds1 to less than α×Vin and set Vds2 to less than β×Vin during the operation suspension period.

Incidentally, in this embodiment, the semiconductor circuit 10 is set as the one including the switch SW1 similarly to the second embodiment, but, without being limited to this, may have a configuration not including the switch SW1 similarly to the first embodiment. The presence/absence of this switch SW1 is not limited to the drawings similarly in the embodiments explained below either.

Fourth Embodiment

Figure 4:
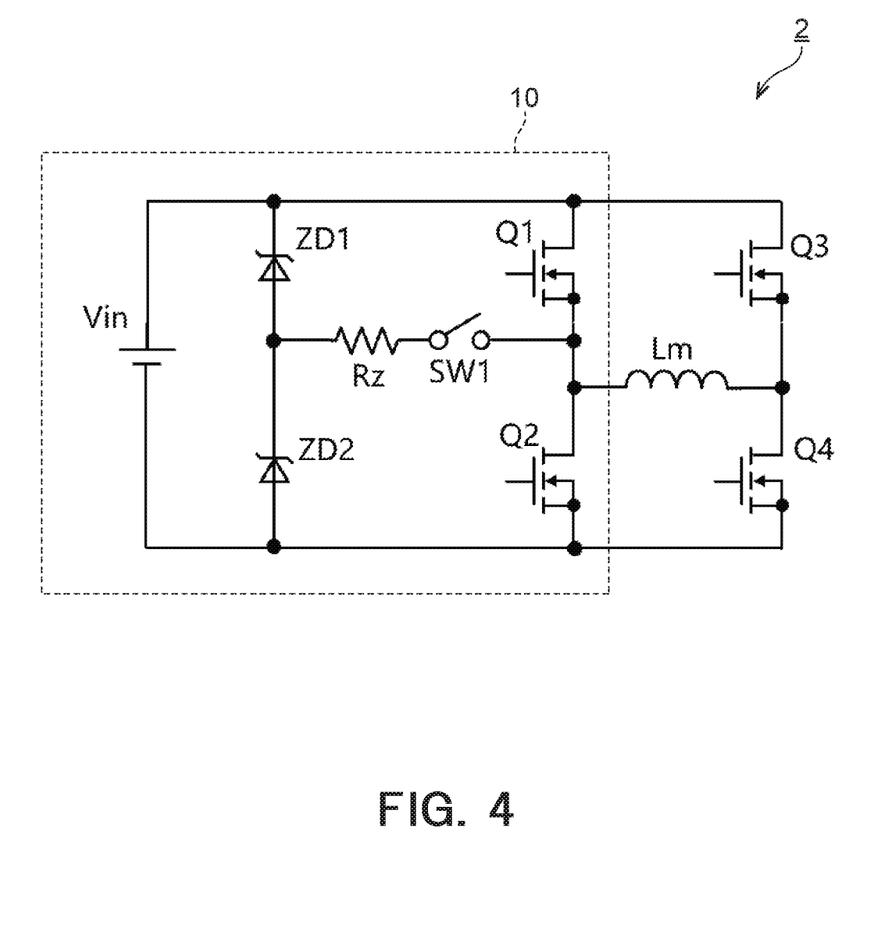
FIG. 4 is a circuitry diagram of a semiconductor circuit according to one embodiment.

FIG. 4 is a circuitry diagram of an H-bridge circuitry (full-bridge circuitry) according to a fourth embodiment. An H-bridge circuitry 2 includes a semiconductor circuit 10 similarly to the half-bridge circuitry 1 in each of the above-described embodiments. Zener voltages of diodes are set by using a, p similarly to the above-described embodiments.

The H-bridge circuitry 2 further includes an inductor Lm, a third transistor Q3, and a fourth transistor Q4.

The third transistor Q3 is, for example, an n-type MOS-FET, and Q3's drain is connected to the positive terminal of a power supply Vin and Q3's source is connected to the source of the fourth transistor Q4. To the gate of the third transistor Q3, a drive signal from a not-illustrated drive circuit is applied.

The fourth transistor Q4 is, for example, an n-type MOS-FET, and Q4's drain is connected to the source of the third transistor Q3 and Q4's source is connected to the negative terminal of the power supply Vin. To the gate of the fourth transistor Q4, a drive signal from the not-illustrated drive circuit is applied. In this fourth transistor Q4, its drive is controlled by the drive circuit so that a timing to turn on does not overlap at least an on timing of the third transistor Q3.

In such a manner, the third transistor Q3 and the fourth transistor Q4 are connected in series, and connected in parallel with a first transistor Q1 and a second transistor Q2.

A drain-source voltage of the third transistor Q3 is defined as Vds3, and a drain-source voltage of the fourth transistor Q4 is defined as Vds4. During an operation suspension period, Vds1=Vds3, Vds2=Vds4 hold due to the existence of Lm.

The inductor Lm is connected between (a) a connection node between the first transistor Q1 and the second transistor Q2, and (b) a connection node between the third transistor Q3 and the fourth transistor Q4.

When attention is focused on the semiconductor circuit 10 in FIG. 4, the formula (1) to the formula (10) hold similarly to the first embodiment. Moreover, when a relationship of the voltages between the above-described diodes is used, the following formulas also hold.

$$(1-\alpha) \cdot V{\rm in} < V{ds4} < \beta \cdot V{\rm in} \qquad (11)$$

$$(1-\beta) \cdot V{\rm in} < V{ds3} < \alpha \cdot V{\rm in} \qquad (12)$$

As a result, during the operation suspension period, Vds1<α×Vin and Vds2<β×Vin hold, and moreover, Vds3<α×Vin and Vds4<β×Vin also hold.

As described above, according to this embodiment, the semiconductor circuit 10 can also be applied to the H-bridge circuitry. In this case, regarding the first transistor Q1, the second transistor Q2, the third transistor Q3, and the fourth transistor Q4, similarly to the above-described embodiments, it becomes possible to keep a bias voltage less than a power supply voltage.

Fifth Embodiment

Figure 5:
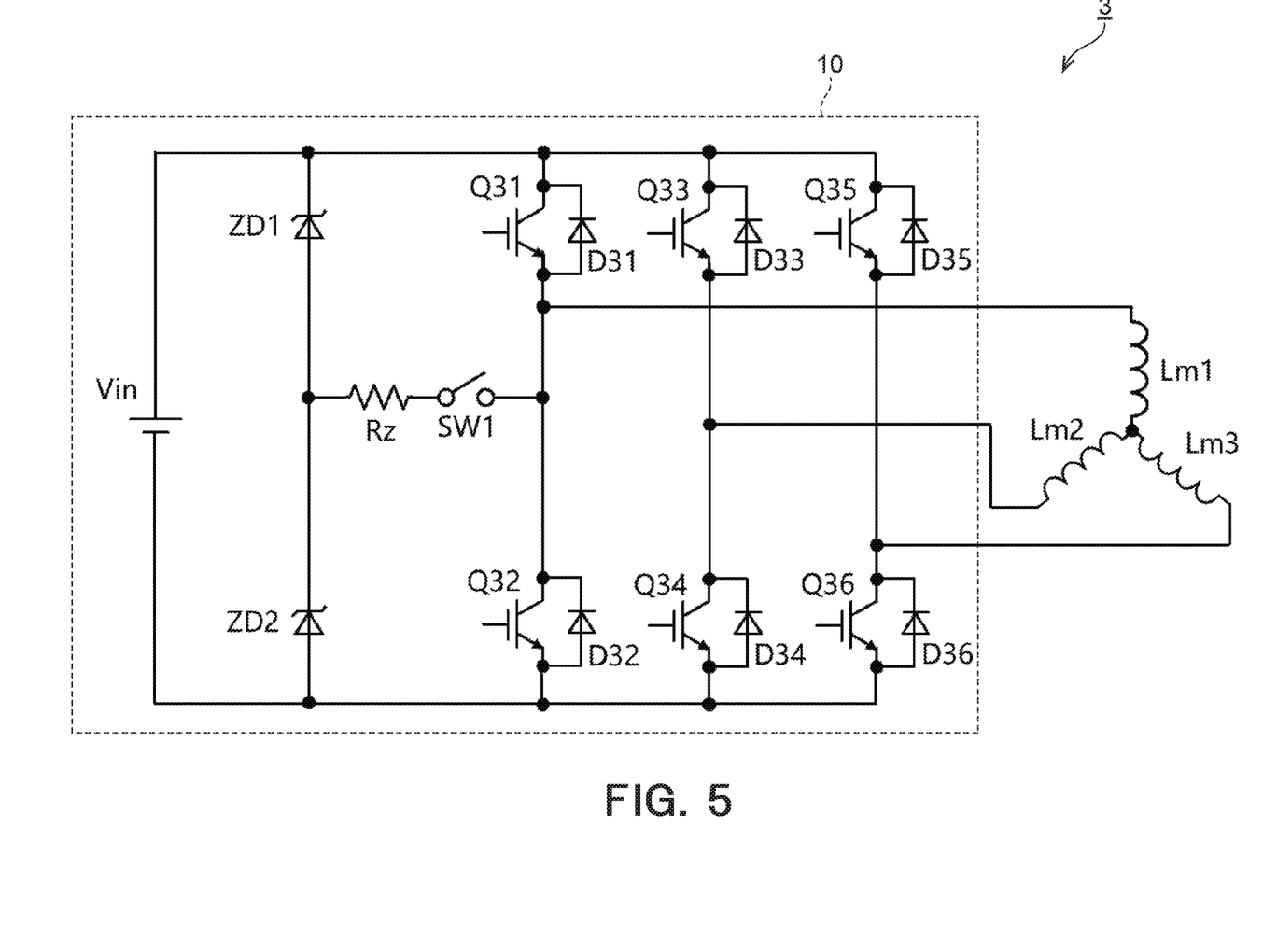
FIG. 5 is a circuitry diagram of a semiconductor circuit according to one embodiment.

FIG. 5 is a diagram illustrating another usage example of a semiconductor circuit 10 having a configuration similar to those in the above-described embodiments according to a fifth embodiment. The fifth embodiment is an example of using the semiconductor circuit 10 as an inverter circuitry.

An inverter circuitry 3 is constituted by the semiconductor circuit 10, and to this semiconductor circuit 10, inductors Lm1, Lm2, Lm3 are connected. These inductors Lm1, Lm2, Lm3 are included as a motor drive circuit in, for example, a BLDC motor (Brushless Direct Current motor).

The semiconductor circuit 10 includes a first transistor Q31, a second transistor Q32, a third transistor Q33, a fourth transistor Q34, a fifth transistor Q35, and a sixth transistor Q36. Each of the transistors is, for example, an IGBT (Insulated Gate Bipolar Transistor), and the respective transistors are connected with diodes D31, D32, D33, D34, D35, D36.

In the first transistor Q31, for example, Q31's collector is connected to the positive terminal of a power supply Vin, and Q31's emitter is connected to the collector of the second transistor Q32. Further, the anode of the diode D31 is connected to the emitter of the first transistor Q31, and the cathode of the diode D31 is connected to the collector.

In the second transistor Q32, for example, Q32's collector is connected to the emitter of the first transistor Q31, and Q32's emitter is connected to the negative terminal of the power supply Vin. Further, the anode of the diode D32 is connected to the emitter of the second transistor Q32, and the cathode of the diode D32 is connected to the collector.

In the third transistor Q33, for example, Q33's collector is connected to the positive terminal of the power supply Vin, and Q33's emitter is connected to the collector of the fourth transistor Q34. Further, the anode of the diode D33 is connected to the emitter of the third transistor Q33, and the cathode of the diode D33 is connected to the collector.

In the fourth transistor Q34, for example, Q34's collector is connected to the emitter of the third transistor Q33, and Q34's emitter is connected to the negative terminal of the power supply Vin. Further, the anode of the diode D34 is connected to the emitter of the fourth transistor Q34, and the cathode of the diode D34 is connected to the collector.

In the fifth transistor Q35, for example, Q35's collector is connected to the positive terminal of the power supply Vin, and Q35's emitter is connected to the collector of the sixth transistor Q36. Further, the anode of the diode D35 is connected to the emitter of the fifth transistor Q35, and the cathode of the diode D35 is connected to the collector.

In the sixth transistor Q36, for example, Q36's collector is connected to the emitter of the fifth transistor Q35, and Q36's emitter is connected to the negative terminal of the power supply Vin. Further, the anode of the diode D36 is connected to the emitter of the sixth transistor Q36, and the cathode of the diode D36 is connected to the collector.

A non-illustrated IGBT drive circuit is connected to gates of these transistors. This IGBT drive circuit may have, for example, a structure with a sensor to be connected to a Hall element, an encoder, or the like of a BLDC motor, or may have a sensorless structure not to be connected to these.

Further, in such a manner that a current flows from the emitters to the collectors of these transistors, the respective transistors are provided as described above. Collector-emitter voltages of these first to sixth transistors are set as Vce1, Vce2, Vce3, Vce4, Vce5, Vce6 respectively. Further, reverse bias voltages of the respective diodes are set as Vr1, Vr2, Vr3, Vr4, Vr5, Vr6 respectively.

Similarly to the above-described embodiments, a Zener voltage of a first diode ZD1 is set to $\alpha \times \text{Vin}$ ($\alpha<1$), and a Zener voltage of a second diode ZD2 is set to $\beta \times \text{Vin}$ ($1-\alpha<\beta<1$), resulting in being set to $(\alpha+B)>1$. In this case, since $(\alpha+\beta) \times \text{Vin} > \text{Vin}$, neither the first diode ZD1 nor the second diode ZD2 is broken down.

Also in this case, the above-described formula (1) to formula (7) hold. Since the collector of the second transistor Q32 is connected to the cathode of the second diode ZD2 via a resistor Rz, the following formula holds once a predetermined time passes after a start of an operation suspension period.

$$Vce2 = Vzd2 \tag{13}$$

When this formula (13) is substituted for the formula (7), $$(1-\alpha) \cdot Vin < Vce2 < \beta \cdot Vin \tag{14}$$

holds. Similarly, the following formula can also be derived.

$$(1-\beta) \cdot Vin < Vce1 < \alpha \cdot Vin \tag{15}$$

From these formula (14) and formula (15), it becomes possible to limit Vce1 to $\alpha \times \text{Vin}$ or less and Vce2 to $\beta \times \text{Vin}$ or less in the operation suspension period. The connection node between the first transistor Q31 and the second transistor Q32, the connection node between the third transistor Q33 and the fourth transistor Q34, and the connection node between the fifth transistor Q35 and the sixth transistor Q36 are connected by the inductors Lm1, Lm2, Lm3. As a result, Vce1=Vce3=Vce5=Vr1=Vr3=Vr5 and Vce2=Vce4=Vce6=Vr2=Vr4=Vr6. Accordingly, it is possible to limit Vce1, Vce3, Vce5, Vr1, Vr3, Vr5 to less than $\alpha \times \text{Vin}$, and limit Vce2, Vce4, Vce6, Vr2, Vr4, Vr6 to less than $\beta \times \text{Vin}$.

As described above, according to this embodiment, the semiconductor circuits 10 explained in the above-described embodiments can also be applied to an inverter circuitry of a brushless motor. Further, it is obvious that the MOSFETs can also be replaced with the IGBTs.

All the embodiments described above can be used for, for example, a multilevel DC-DC converter or the like.

Incidentally, in all the embodiments described above, the Zener diode has been used as the element which limits voltage, but without being limited to this, the element may be replaced with an element capable of properly limiting voltage.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. In a circuitry in which a first transistor and a second transistor are connected to a power supply in series, and which outputs a voltage to be applied to an external load based on a voltage of a connection node between the first transistor and the second transistor, a semiconductor circuitry comprising: a plurality of Zener diodes which are connected in parallel with the first transistor and the second transistor, are reversely biased by the power supply, are connected in series with each other, and divided in two diode groups, a first group having at least one Zener diode and a breakdown voltage Vzd1 of the first group satisfies Vzd1<αVin, where Vin is a voltage of the power supply and α<1; a second group having at least one Zener diode and a breakdown voltage Vzd2 of the second group satisfies Vzd2<βVin, wherein β<1, α+β>1, and Vin=Vzd1+Vzd2; and satisfying (1−α) Vin<Vds2<βVin and (1−β) Vin<Vds1<αVin, where Vds1 is a drain-source voltage of the first transistor and Vds2 is a drain-source voltage of the second transistor; and a first resistor which connects (1) a node between the two diode groups, and (2) the connection node between the first transistor and the second transistor.

2. The semiconductor circuitry according to claim 1, further comprising
a switch connected in series with the first resistor.

3. The semiconductor circuitry according to claim 1, wherein
the first transistor and the second transistor are each a MOSFET (Metal-Oxide-Semiconductor Field-Effect Transistor).

4. The semiconductor circuitry according to claim 1, wherein
the first transistor and the second transistor are each an IGBT (Insulated Gate Bipolar Transistor).

5. The semiconductor circuitry according to claim 1, further comprising
a second resistor connected in series with the plurality of Zener diodes.

6. A bridge circuitry comprising: a power supply; a first transistor whose one terminal is connected to a positive terminal of the power supply; a second transistor whose one terminal is connected to the other terminal of the first transistor and whose other terminal is connected to a negative terminal of the power supply; a first Zener diode whose cathode is connected to the positive terminal of the power supply and whose breakdown voltage is lower than a voltage of the power supply, the breakdown voltage Vzd1 of the first Zener diode satisfies Vzd1<αVin, where Vin is the voltage of the power supply and α<1; a second Zener diode whose cathode is connected to an anode of the first Zener diode and whose anode is connected to the negative terminal of the power supply, a breakdown voltage Vzd2 of the second Zener diode satisfies Vzd2<βVin, wherein β<1, α+β>1, and Vin=Vzd1+Vzd2; and satisfying (1−α) Vin<Vds2<βVin and (1−β) Vin<Vds1<αVin, where Vds1 is a drain-source voltage of the first transistor and Vds2 is a drain-source voltage of the second transistor; and a resistor connected between (1) a connection node between the first transistor and the second transistor, and (2) a second connection node between the first Zener diode and the second Zener diode.

* * * * *